US006844099B1

(12) United States Patent
Gorte et al.

(10) Patent No.: US 6,844,099 B1
(45) Date of Patent: *Jan. 18, 2005

(54) METHOD FOR SOLID OXIDE CELL ANODE PREPARATION

(75) Inventors: Raymond J. Gorte, Narberth, PA (US); John M. Vohs, Newtown Square, PA (US); Radu Craciun, Collierville, TN (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/914,638

(22) PCT Filed: Mar. 3, 2000

(86) PCT No.: PCT/US00/05735
§ 371 (c)(1),
(2), (4) Date: Dec. 27, 2001

(87) PCT Pub. No.: WO00/52780
PCT Pub. Date: Sep. 8, 2000

Related U.S. Application Data

(63) Continuation-in-part of application No. 09/261,324, filed on Mar. 3, 1999, now Pat. No. 6,589,680.

(51) Int. Cl.[7] .............................................. H01M 8/12
(52) U.S. Cl. ........................... 429/33; 429/30; 429/40; 429/41
(58) Field of Search .......................... 429/30, 33, 40, 429/41; 502/101

(56) References Cited

U.S. PATENT DOCUMENTS

| 3,607,433 | A | * | 9/1971 | Isenberg et al. ............ 427/115 |
| 4,661,422 | A | | 4/1987 | Marianowski et al. |
| 4,880,772 | A | * | 11/1989 | Pederson et al. ........... 505/446 |
| 5,306,411 | A | | 4/1994 | Mazanec et al. |
| 5,350,641 | A | | 9/1994 | Mogensen et al. |
| 5,543,239 | A | * | 8/1996 | Virkar et al. ................ 429/33 |
| 5,656,387 | A | | 8/1997 | Barnett et al. |
| 5,676,806 | A | | 10/1997 | Van Berkel et al. |
| 5,731,097 | A | | 3/1998 | Miyashita et al. |
| 6,214,485 | B1 | | 4/2001 | Barnett et al. |
| 6,589,680 | B1 | * | 7/2003 | Gorte et al. ................ 429/33 |
| 2001/0029231 | A1 | * | 10/2001 | Gorte et al. ............... 502/101 |

FOREIGN PATENT DOCUMENTS

| EP | 338 823 | 10/1989 |
| JP | 01 007475 | 1/1989 |
| WO | 00/13791 | 3/2000 |

OTHER PUBLICATIONS

Knovel Critical Tables, Table "Basic Physical Properties of Chemical Compounds", Norwich, New York, 2003.*

K. Eguchi et al.: *Electrical properties of ceria–based oxides and their application to solid oxide fuel cells*, Solid State Ionics, 52, pp. 165–172, 1992.

(List continued on next page.)

*Primary Examiner*—Carol Chaney
(74) *Attorney, Agent, or Firm*—Mark E. Fejer

(57) ABSTRACT

A method for preparation of an anode for a solid oxide fuel cellin which a plurality of zircon fibers are mixed with a yttria-stabilized zirconia (YSZ) powder, forming a fiber/powder mixture. The fiber/powder mixture is formed into a porus YSZ layer and calcined. The calcined porous YSZ layer is then impregnated with a metal-containing salt solution. Preferred metals are Cu and Ni. An anode and a method for manufacturing a fuel cell containing such anode is also disclosed. Such anode is particularly peformant when the fuel cell is fed with dry hydrocarbons, in absence or low content of steam.

20 Claims, 8 Drawing Sheets

OTHER PUBLICATIONS

M. Mogensen et al.: *Physical Properties of Mixed Conductor Solid Oxide Fuel Cell Anodes of Doped $CeO_2$*, J. Electrochem. Soc., vol. 141, No. 8, pp. 2122–2128, Aug. 1994.

E.S. Putna et al.: *Ceria–Based Anodes for the Direct Oxidation of Methane in Solid Oxide Fuel Cells*, Langmuir, vol. 11, No. 12, pp. 4832–4837, 1995.

R.T. Baker et al.: *Evaluation of perovskite anodes for the complete oxidation of dry methane in solid oxide fuel cells*, Solid State Ionics, 72, pp. 328–333, 1994.

K. Asano et al.: *A Novel Solid Oxide Fuel Cell System Using the Partial Oxidation of Methane*, J. Electrochem. Soc., vol. 142, No. 10, pp. 3241–3245, Oct. 1995.

Y. Hiei et al.: *Partial oxidation of methane for internally reformed solid oxide fuel cell*, Solid State Ionics, vol. 86–88, pp. 1267–1272, 1996.

N.M. Sammes et al.: *Synthesis and properties of dense nickel and cobalt zirconia cermet anodes for solid oxide fuel cells*, J. Mat. Sci, 31, pp. 6069–6072, 1996.

C.H. Bartholomew, *Carbon Deposition in Steam Reforming and Methanation*, Catal. Rev.—Sci. Eng., 24 (1), pp. 67–112, 1982.

T. Kawada et al: *Electrical properties of transition–metal–doped YSV*, Solid State Ionics, vol. 53–56, pp. 418–425, 1992.

T. Tsai et al.: *Effect of Mixed–Conducting Interfacial Layers on Solid Oxide Fuel Cell Anode Performance*, J. Electrochem. Soc, vol. 145, No. 5, pp. 1696–1701, May 1998.

H. Itoh et al.: *Configurational and Electrical Behavior of Ni–YSZ Cermet with Novel Microstructure for Solid Oxide Fuel Cell Anodes*, J. Electrochem. Soc, vol. 144, No. 2, pp. 641–646, Feb. 1997.

H. Itoh et al.: *Improved Microstructure of Ni–YSZ Cermet Anode for SOFC with a Long Term Stability*, Denki Kagaku, vol. 64, NO. 6, pp. 549–554, 1996.

M. Mogensen et al.: *Kinetic and geometric aspects of solid oxide fuel cell electrodes*, Solid State Ionics, vol. 86–88, pp. 1151–1160, 1996.

M. Watanabe et al.: *High Performance Catalyzed–Reaction Layer for Medium Temperature Operating Solid Oxide Fuel Cells*, J. Electrochem. Soc, vol. 141, No. 2, pp. 342–346, Feb. 1994.

R.T.K. Baker: *Catalytic Growth of Carbon Filaments*, Carbon, vol. 27, No. 3, pp. 315–323, 1989.

H. Alqahtany et al.: *Methane Steam Reforming over Fe Electrodes in a Solid Electrolyte Cell*, Energy & Fuels, 7, pp. 495–504, 1993.

* cited by examiner

YSZd = dense YSZ
YSZp = porous YSZ

□, $P_{max}$ = 5.1 mW/cm$^2$
○, $P_{max}$ = 19.4 mW/cm$^2$
△, $P_{max}$ = 34.6 mW/cm$^2$
▼, $P_{max}$ = 4.0 mW/cm$^2$
●, $P_{max}$ = 46.6 mW/cm$^2$ □, $P_{max}$ = 46.6 mW/cm$^2$
○, $P_{max}$ = 64.3 mW/cm$^2$
△, $P_{max}$ = 142.1 mW/cm$^2$
▼, $P_{max}$ = 146.4 mW/cm$^2$

US 6,844,099 B1

METHOD FOR SOLID OXIDE CELL ANODE PREPARATION

This application is a continuation-in-part of U.S. application Ser. No. of 09/261,324, filed Mar. 3, 1999, now U.S. Pat. No. 6,589,680.

BACKGROUND OF INVENTION

1. Field of the Invention

This invention relates to a method for preparation of anodes for use in solid oxide fuel cells. More particularly, this invention relates to a method for preparation of an anode for a solid oxide fuel cell in which metals and catalytic materials employed in such anodes are added in a separate step compared to conventional methods of anode preparation.

2. Description of Prior Art

Solid oxide fuel cells have grown in recognition as a viable high temperature fuel cell technology. There is no liquid electrolyte with its attending metal corrosion and electrolyte management problems. Rather, the electrolyte of the cells is made primarily from solid ceramic materials so as to survive the high temperature environment. The operating temperature of greater than about 600° C. allows internal reforming, promotes rapid kinetics with non-precious materials, and produces high quality by-product heat for cogeneration or for use in a bottoming cycle. The high temperature of the solid oxide fuel cell, however, places stringent requirements on its materials. Because of the high operating temperatures of conventional solid oxide fuel cells (approximately 1000° C.), the materials used in the cell components are limited by chemical stability in oxidizing and reducing environments, chemical stability of contacting materials, conductivity, and thermomechanical compatibility.

The most common anode materials for solid oxide fuel cells are nickel (Ni)-cermets prepared by high-temperature calcination of NiO and yttria-stabilized zirconia (YSZ) powders. High-temperature calcination is essential in order to obtain the necessary ionic conductivity in the YSZ. These Ni-cermets perform well for hydrogen ($H_2$) fuels and allow internal steam reforming of hydrocarbons if there is sufficient water in the feed to the anode. Because Ni catalyzes the formation of graphite fibers in dry methane, it is necessary to operate anodes at steam/methane ratios greater than 3. However, there are significant advantages to be gained by operating under dry conditions. Progress in this area has been made using an entirely different type of anode, either based on ceria (See Eguchi, K, et al., *Solid State Ionics*, 52, 165 (1992); Mogensen, G., *Journal of the Electrochemical Society*, 141, 2122 (1994); and Putna, E. S., et al., *Langmuir*, 11 4832 (1995)) or perovskite anodes (See Baker, R. T., et al., *Solid State Ionics*, 72, 328 (1994); Asano, K., et al., *Journal of the Electrochemical Society*, 142, 3241 (1995); and Hiei, Y., et al., *Solid State Ionics*, 86–88, 1267 (1996).). These oxides do not, however, provide sufficient electronic conductivity. Replacement of Ni for other metals, including Co (See Sammes, N. M., et al., *Journal of Materials Science*, 31, 6060 (1996)), Fe (See Bartholomew, C. H., *Catalysis Review-Scientific Engineering*, 24, 67 (1982)), Ag or Mn (See Kawada, T., et al., *Solid State Ionics*, 53–56, 418 (1992)) has been considered; however, with the possible exception of Ag, these are likely to react with hydrocarbons in a way similar to that of Ni. Substitution of Ni with Cu would also be promising but for the fact that CuO melts at the calcination temperatures which are necessary for establishing the YSZ matrix in the anodes.

It is also well known that the addition of ceria to the anode improves performance. However, the high-temperature calcination utilized in conventional anode preparation causes ceria to react with YSZ, as a result of which performance is not enhanced to the extent which could be possible if formation of ceria-zirconia did not occur.

SUMMARY OF THE INVENTION

Accordingly, it is one object of this invention to provide a method for preparation of solid oxide fuel cell anodes which enables the use of lower melting temperature materials than employed by conventional solid oxide fuel cell anodes.

It is another object of this invention to provide a process for solid oxide fuel cell anode preparation which enables efficient operation using dry natural gas as a fuel.

It is another object of this invention to provide a method for generation of electricity by direct oxidation of hydrocarbons and other carbonaceous fuels.

It is yet another object of this invention to provide a method for a solid oxide fuel cell anode preparation which enables the use of ceria to improve anode performance while avoiding the formation of ceria-zirconia which reduces the extent of performance enhancement in conventional solid oxide fuel cell anodes.

These and other objects of this invention are addressed by a method for preparation of an anode for a solid oxide fuel cell in which a plurality of zircon fibers or other porous matrix material is mixed with a yttria-stabilized-zirconia (YSZ) powder, thereby forming a fiber/powder mixture. The fiber/powder mixture is then formed into a porous YSZ layer and calcined. The calcined porous YSZ layer is then impregnated with a metal-containing salt solution. Accordingly, contrary to conventional methods for solid oxide fuel cell anode preparation, the method of this invention results in a YSZ layer which remains highly porous following high-temperature calcination to which any suitable metal, including Cu and Ni is then added by impregnation of the salt solution, after the high temperature calcination of the YSZ layer. In addition to enabling the use of metals whose oxides have a low melting temperature, the method of this invention also allows catalytic materials, such as ceria and/or palladium (Pd) to be added in controlled amounts in a separate step.

Cells prepared in accordance with the method of this invention with Ni perform in a very similar manner to those cells prepared using conventional means. With Cu used in place of Ni, there is a possibility of oxidizing hydrocarbons ($C_xH_y$) and other carbonaceous fuels ($C_xH_yO_z$) such as methanol, ethanol, propanol and the like directly, particularly since Cu is inert in dry methane. Even without direct conversion, the Cu-YSZ anode allows the use of dryer gases partially reformed methane), because Cu is inert to methane. To convert methane, it is necessary to add a catalytic component. Ceria, particularly when doped with noble metals like Pd, Pt, or Rh, is active for this process.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
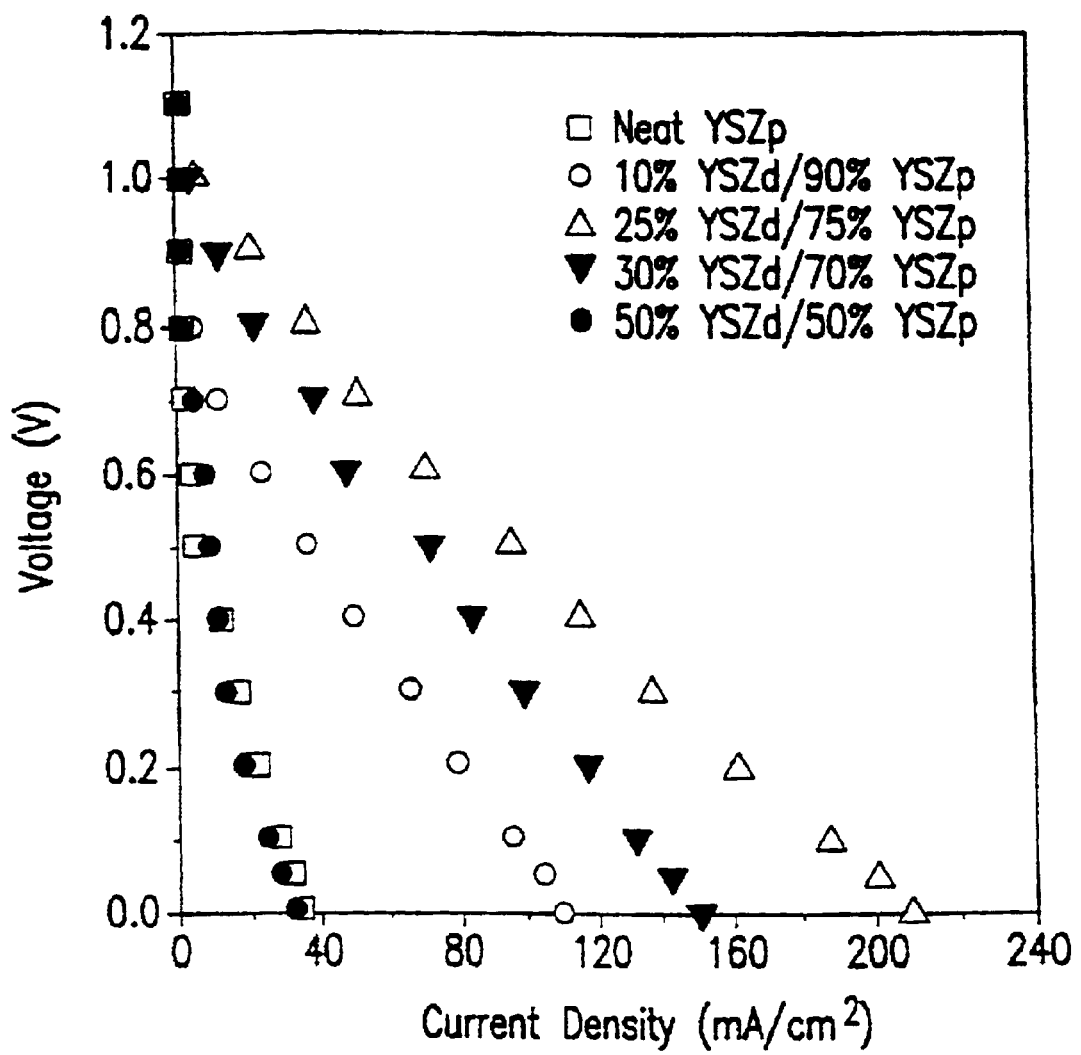
FIG. 1 is a diagram showing the I-V relationship for cells at 800° C. in $H_2$ prepared by impregnating porous YSZ with 40% Cu in accordance with one embodiment of this invention.

As previously stated, conventional solid oxide fuel cells are unable to operate efficiently in dry natural gas. This is due to the fact that they typically have Ni-cermet anodes which are prepared by high-temperature calcination of powders consisting of NiO and yttria-stabilized zirconia. High-temperature calcination is essential in order to obtain the necessary ionic conductivity in the YSZ. Under the reducing conditions of operation, NiO is reduced to the metal and provides electronic conductivity. However, in dry methane, Ni tends to form graphite fibers which quickly deactivate the system. Ni can be replaced by Fe or Co, but these metals suffer from similar problems. We have developed a method for preparation of an anode for a solid oxide fuel cell which allows the addition of the electron-conducting metal, including metals like Cu, for which the oxide melts at low temperature, in a manner which does not require the high-temperature calcination of conventional methods. In addition, catalytic and ion-transfer components, such as ceria, lanthana, manganese, and precious metals can also be added without further, high-temperature treatment.

In accordance with the method of this invention, a plurality of zircon fibers or other porous matrix material is mixed with a yttria-stabilized-zirconia powder, forming a fiber/powder mixture. The fiber/powder mixture is formed into a porous YSZ layer and calcined. After calcination, the porous YSZ layer is impregnated with a metal-containing salt solution. In accordance with one preferred embodiment of this invention, the metal-containing salt solution comprises a nitrate salt of a metal selected from the group consisting of Cu, Ni and mixtures thereof.

In accordance with one preferred embodiment of this invention, the fiber/powder mixture is made into a slurry with glycerol and then applied to the anode side of the dense YSZ electrolyte of a solid oxide fuel cell. In accordance with another preferred embodiment, the powdered fibers are added to a tapecast which can be included as a layer in a composite with a second layer which will give dense YSZ. The system is then calcined at a suitable temperature, for example 1550° C., for two hours. After addition of the cathode to the cathode side of the YSZ electrolyte, the porous YSZ layer on the anode side is impregnated with aqueous solutions of $Ni(NO_3)_2$ or $Cu(NO_3)_2$ to bring the metal content of the anode to at least 35% by weight metal, after which the anode is calcined at 950° C. for two hours. It is very important either to mix a normal YSZ powder (about 20% by weight) with the zircon fibers in the original glycerol slurry, or to add ceria or YSZ to the porous YSZ layer so as to provide sufficient oxide in the anode for ionic conductivity. Ceria in accordance with one embodiment of this invention is added using an aqueous solution of $Ce(NO_3)_3$ to the porous anode, after addition of the metal. After drying, the anode is again calcined to 900° C. to form the oxide or ceria. In accordance with a particularly preferred embodiment of this invention, ceria constitutes in the range of about 5% to about 40% by weight of the porous YSZ layer.

EXAMPLE

Yttria-stabilized zirconia (8% $Y_2O_3$, Tosoh TZ-8Y, denoted as YSZd) was used for the fabrication of the electrolyte and conventionally prepared anode for a solid oxide fuel cell. The electrolyte wafers were formed from YSZd by tapecasting, followed by calcination to 1400° C. for two hours. The cathodes were formed from a 50% by weight physical mixture of Sr-LaMnO$_3$ and YSZd powders, pasted onto the electrolyte with glycerol, and then calcined at 1250° C. for two hours. The conventional, Ni-cermet anode was prepared using a 50% by weight physical mixture of NiO and YSZd, followed by calcination to 900° C. This Ni-cermet was pasted onto the electrolyte using glycerol and calcined to 1400° C.

In accordance with the method of this invention for preparation of an anode for a solid oxide fuel cell, a porous YSZ layer was prepared from physical mixtures of zircon fibers (YSZ, 75% porosity, with less than about 0.3% Si, Zircar Products, Inc., denoted as YSZp) and YSZd. The physical mixture (denoted as YSZm) was pasted onto the electrolyte using glycerol and calcined to 1550° C. for two hours. After addition of the cathode, the porous YSZ layer was impregnated with aqueous solutions of $Cu(NO_3)_2$ (Fisher Scientific) or $Ni(NO_3)_2$ (Aldrich) followed by calcination at 950° C. for two hours, at a Cu (or Ni) content of 40% by weight.

A sample doped with ceria was prepared by adding ceria in an amount of about 5 to about 40 weight percent of the anode material, to the anode by impregnation using $Ce(NO_3)_3 6H_2O$ (Aldrich) followed by calcination to 950° C. The fraction of YSZd used in the anode and the metal content of the anode were varied.

Pt electrodes were attached to both anodes and cathodes using a Pt ink (Engelhard, A4338), followed by calcination at 950° C. for thirty minutes. The cells were sealed into $Al_2O_3$ tubes using quartz powder in polyvinyl solutions. They were then conditioned in $H_2$ for three to four hours at 950° C. The performance of the cells was measured using flowing $H_2$ at 1 atmosphere at the anode, and the cathode was open to air.

SEM images were obtained using a JEOL 6300 microscope equipped with an X-ray analyzer for EDX analysis. Samples were deposited onto carbon tape and coated with a gold film before analysis. X-ray powder diffraction patterns were obtained with a Rigaku XRD diffractometer, using Cu Kα radiation (λ=1.541838 Å). The mean crystallite size ($\bar{d}$) of YSZ particles was determined from XRD line-broadening measurements using the Scherrer equation.

FIG. 1 shows the performance for series of cells prepared with Cu-cermet anodes at 800° C. In this series, the Cu content was maintained at approximately 40% by weight, but the fraction of non-porous YSZd was varied. Performance for the pure zircon fibers (neat YSZp) was poor, giving a maximum power density of only 5.1 mW/cm² and a maximum current density of 35 mA/cm². Adding YSZd to the layer improved the performance significantly, with the best performance being achieved at about 25% by weight YSZd. The maximum power density for this cell was nearly 50 mW/cm², with a maximum current density of 210 mA/cm². Increasing the fraction of YSZd in the layer led to poorer performance. The results in FIG. 1 demonstrate the importance of maintaining the proper structure of the YSZ in the anode as well as the possibility of a deleterious effect of Si in the zircon fibers.

Figure 2A:
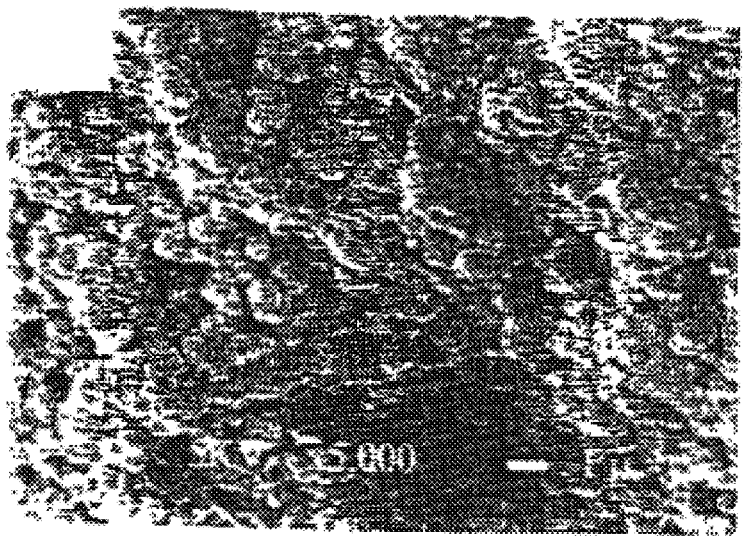
FIGS. 2A, 2B, and 2C show SEM micrographs for conventional Ni-cermet prepared from NiO and dense yttria-stabilized zirconia, designated as YSZd, neat porous yttria-stabilized zirconia designated as YSZp, and Cu-cermet prepared from 25% YSZd impregnated with 40% Cu, respectively.
Figure 2B:
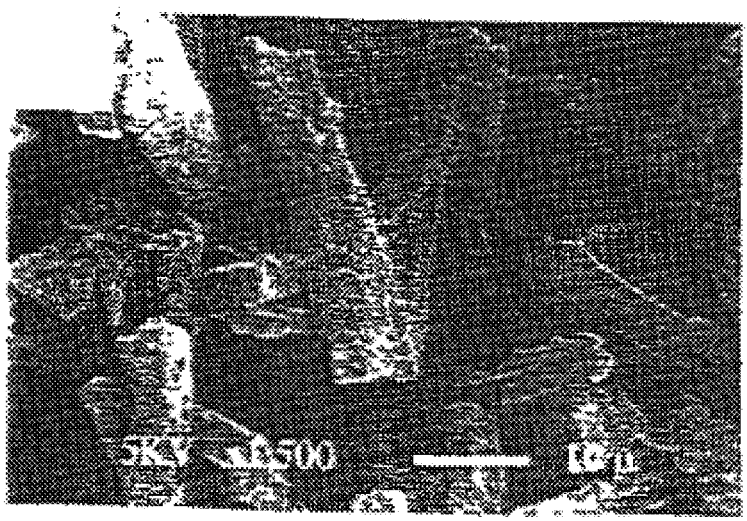
Figure 2C:
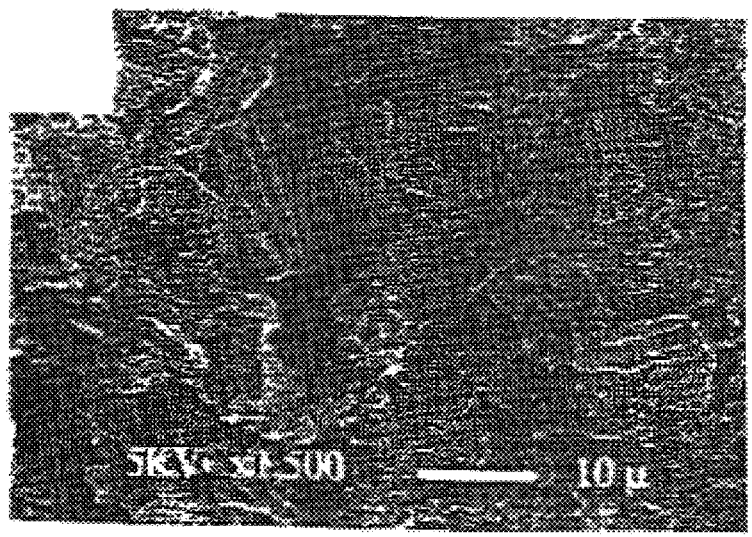

FIGS. 2A, 2B, and 2C show SEM pictures of several representative samples of anodes taken for the purpose of investigating their morphologies. FIG. 2A is a micrograph of the conventional Ni-cermet taken at a magnification of 5000×. Shown is a dense film made up of about 1-micron particles. Before exposure to $H_2$ (the fuel atmosphere), EDX analysis and XRD patterns show the presence of NiO particles as a physical mixture with the YSZ ($\bar{d}$=28.5 nm). After exposure to $H_2$ at 950°–800° C. (reducing atmosphere), NiO is reduced to Ni metal ($\bar{d}$=26 nm), determining a small porosity (about 20%) to the compact NiO-YSZ material. The micrographs of the neat zircon fibers, shown in FIG. 2B at 1500× after heating to 1550° C., show rods, roughly 20 microns long and 5 microns in diameter. The film remains highly porous, about 70% void, but contact between the rods appears to be poorer. Finally, the film formed by adding 25% by weight YSZd and Cu in accordance with the method of this invention is shown in FIG. 2C. The structure remains open due to the rod-like fibers. Even with the addition of non-porous YSZd and significant amounts of Cu, the film remains highly porous. Before $H_2$ exposure, small crystallites of CuO ($\bar{d}$=12.3 nm) were formed on the YSZm material. After $H_2$ exposure at 950° C., Cu metal particles ($\bar{d}$=34 nm) are formed, as was observed in the Ni-cermet case.

Figure 3:
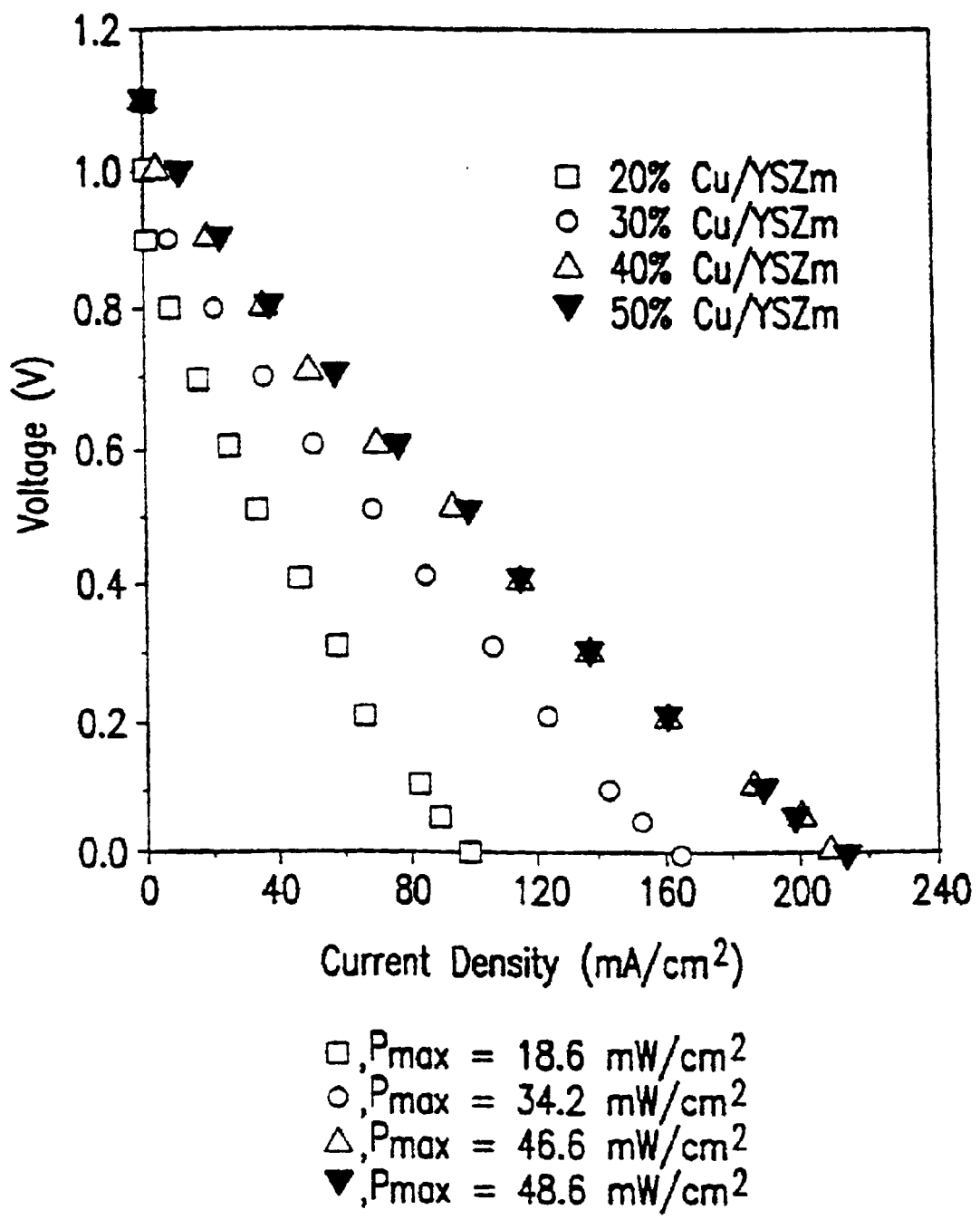
FIG. 3 is a diagram showing the I-V relationship for cells at 800° C. in $H_2$ prepared by impregnating porous YSZ (25% YSZd) with varying amounts of Cu.

The effect of changing the Cu content in the anode for the YSZm made from 25% by weight YSZd is shown in FIG. 3. As can be seen, there is a definite improvement in cell performance observed with increases in Cu from about 20% to about 50% by weight Cu.

Figure 4:
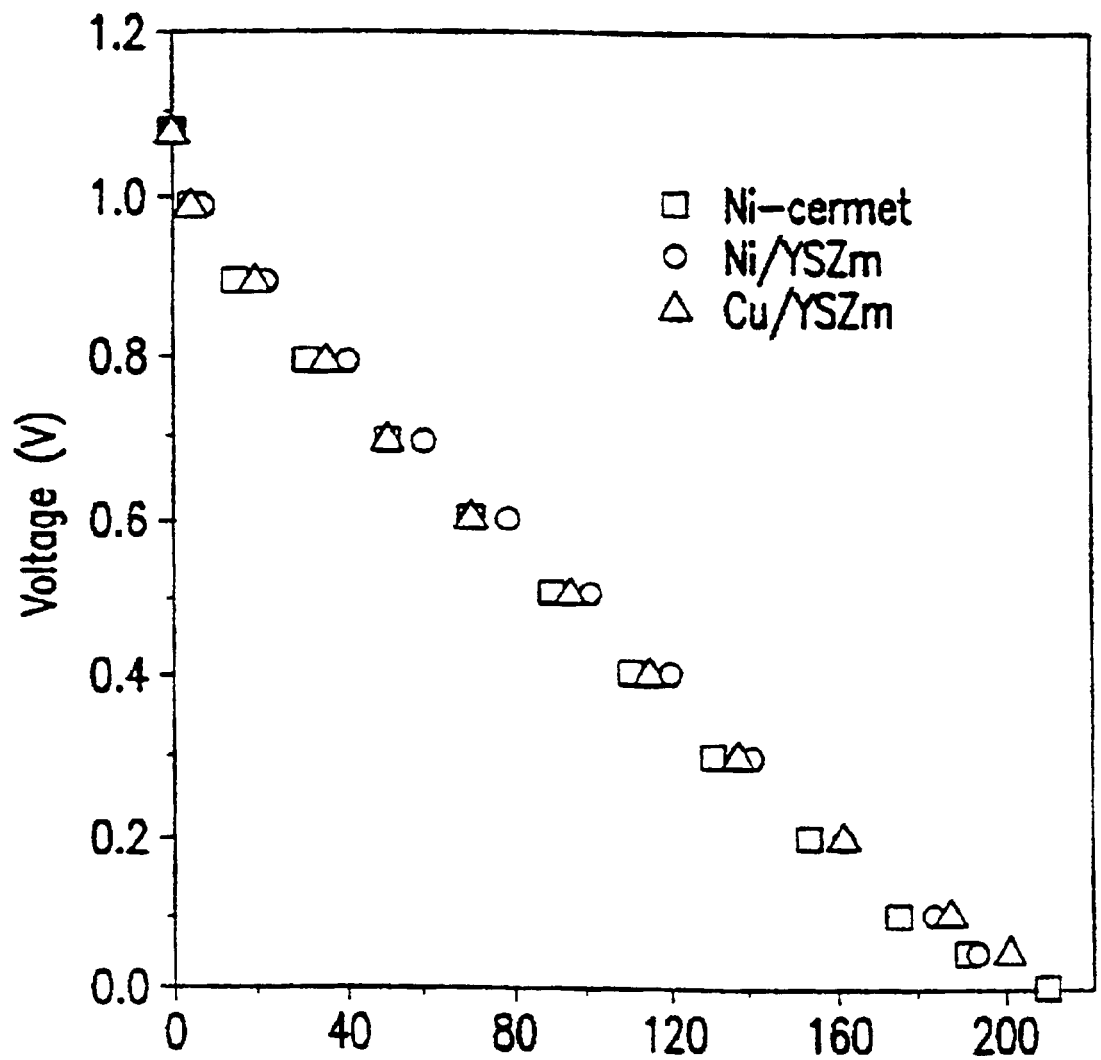
FIG. 4 is a diagram showing the I-V relationship for cells at 800° C. in $H_2$ with a conventional Ni-cermet anode, a Ni-cermet anode prepared from porous YSZ (25% YSZd), and Cu-cermet prepared from porous YSZ (25% YSZd)

FIG. 4 shows a comparison of results for a Ni-cermet anode prepared by conventional methods, a Ni-cermet with 40% Ni prepared from YSZm in accordance with one embodiment of this invention and a Cu-cermet with 40% by weight Cu prepared from YSZm in accordance with one embodiment of this invention. The results for all three cells are virtually identical, with maximum power densities between 45 and 50 mW/cm². The similarity in performance suggests that the performance of these three cells is limited by the electrolyte and cathodes and not the anodes. In addition, because the catalytic properties of Ni and Cu are very different, with $H_2$ dissociation occurring much more readily on Ni, this suggests that the catalytic properties of the metals are not crucial in this application with $H_2$ fuels. Rather Ni and Cu are primal electronic conductors in this case.

Figure 5:
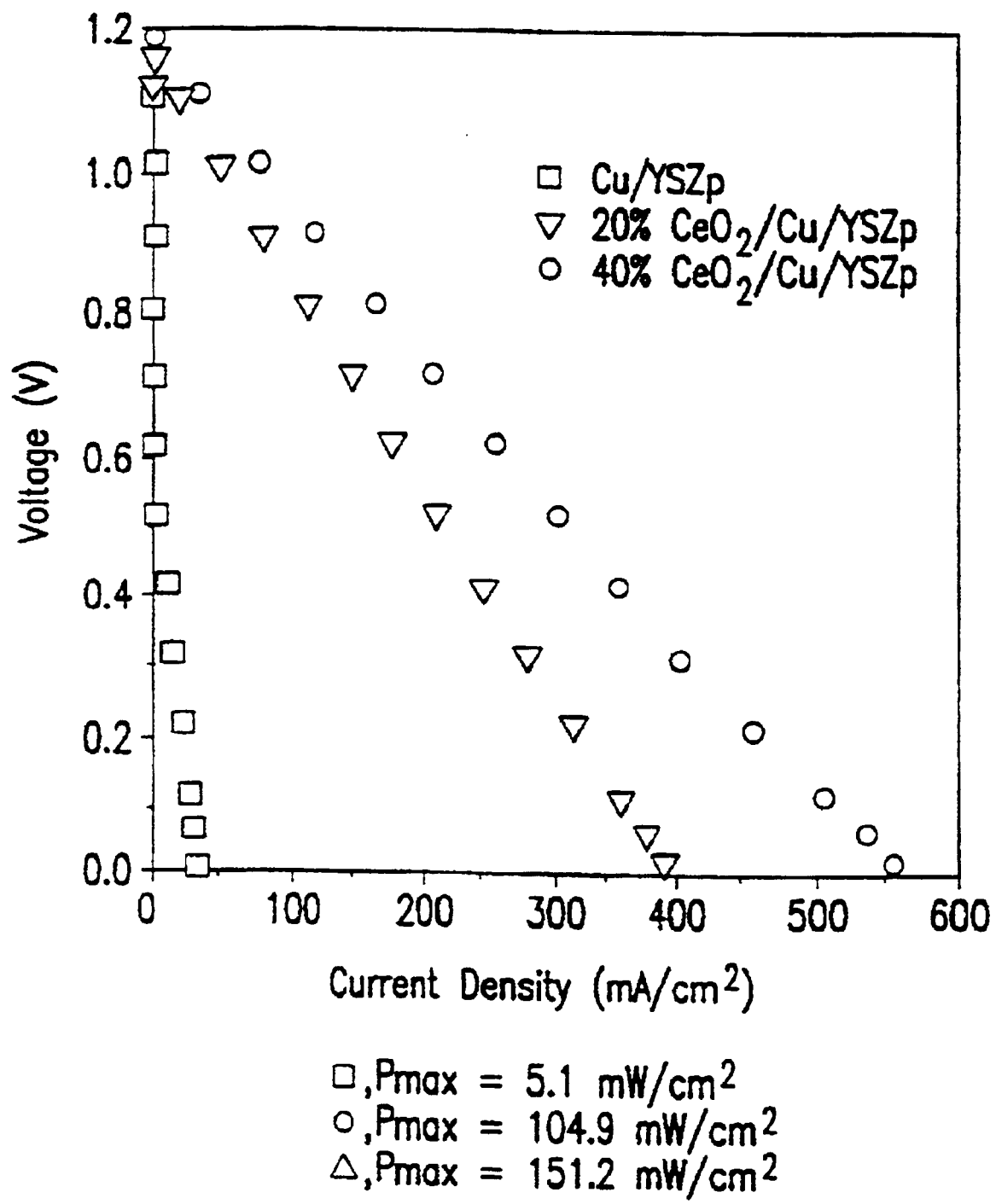
FIG. 5 is a diagram showing the I-V relationship for cells at 800° C. in $H_2$ with the addition of ceria to Cu/YSZp.
Figure 6:
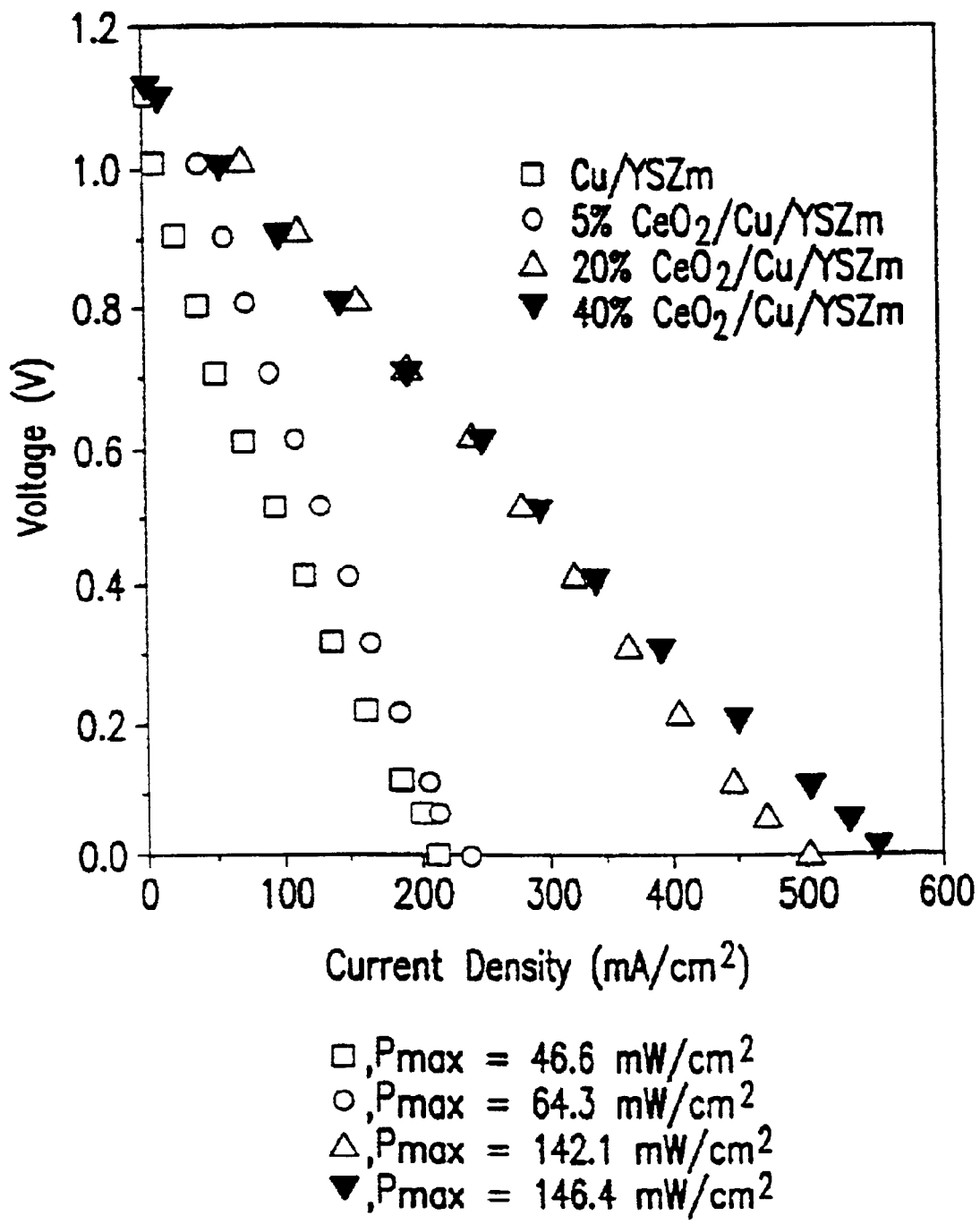
FIG. 6 is a diagram showing the I-V relationship for cells at 800° C. in $H_2$ with the addition of ceria to Cu/YSZ mixture.

FIGS. 5 and 6 show the typical doping effect of ceria on Cu/YSZp and Cu/YSZm prepared using the method of this invention. The data for these cells shows that the power densities increased significantly with the addition of ceria. For 40% by weight ceria addition to Cu/YSZp and Cu/YSZm, the best results achieved were 151.2 mW/cm² and 146.4 mW/cm², which compared to 5.1 mW/cm² and 46.6 mW/cm obtained in the same cells without ceria. The measure current density on $CeO_2$/Cu/YSZp was much higher than neat Cu/YSZp according to ceria contents. However, the current density does not increase over 20% by weight ceria on Cu/YSZm. In such ceria content range, there is a limit to the improvement of cell performance obtained.

Figure 7:
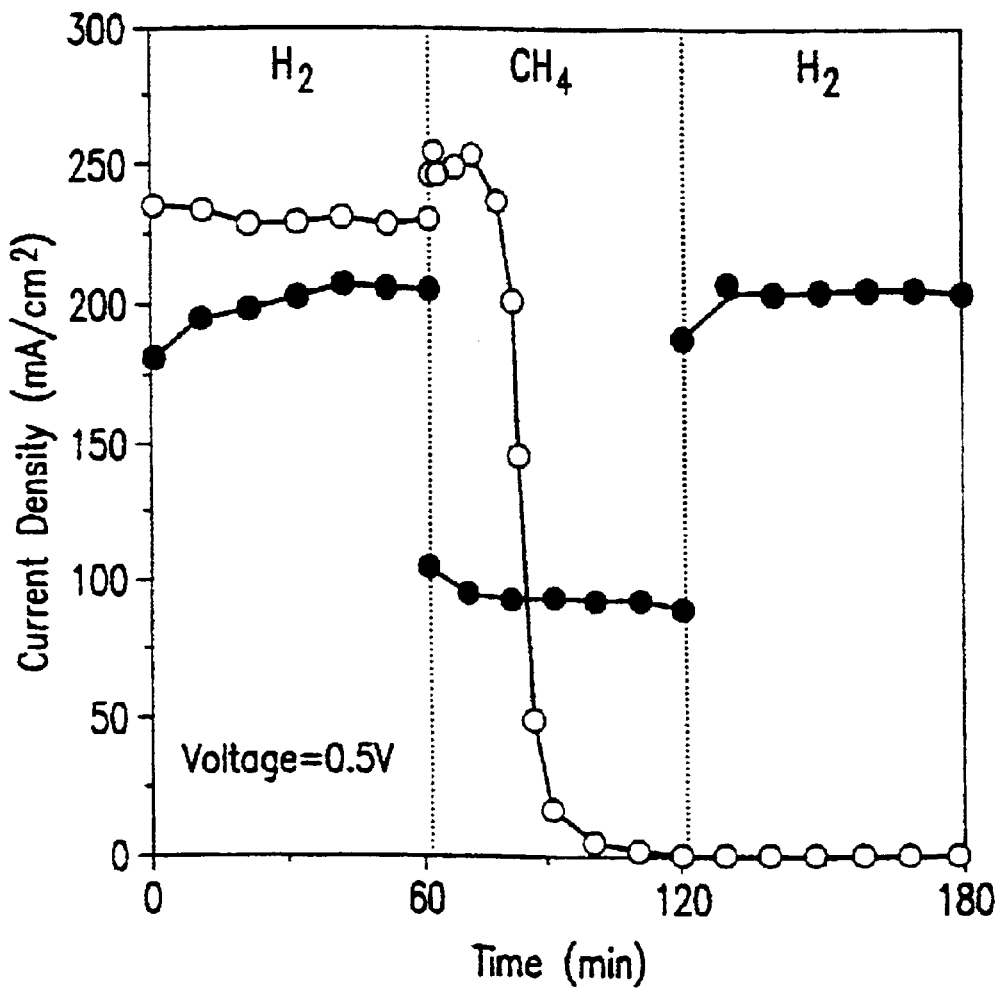
FIG. 7 is a diagram showing current density as a function of time for Ni- and Cu-based cells during switching of fuels from dry $H_2$ to dry $CH_4$ and back.
Figure 8:
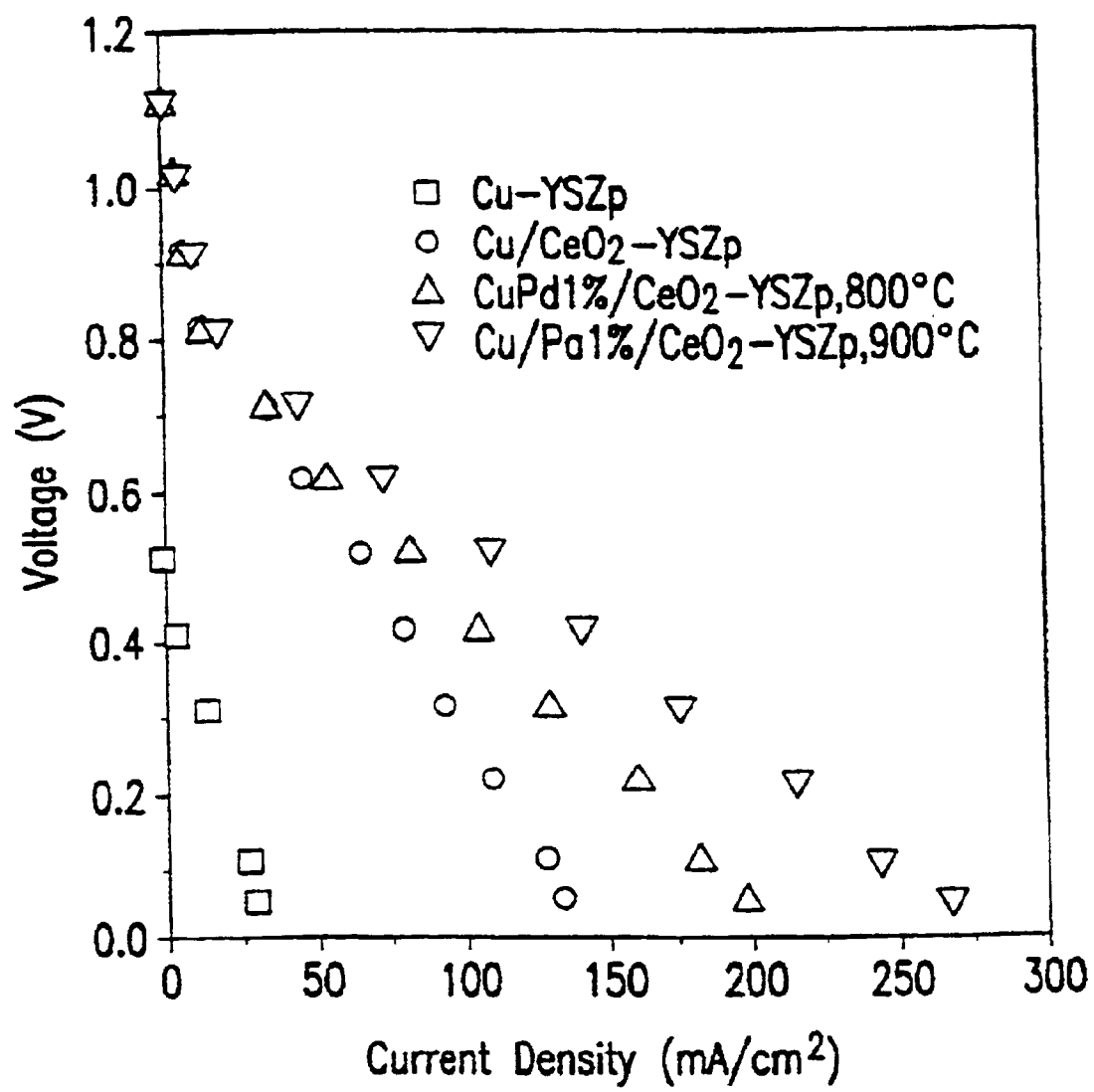
FIG. 8 is a diagram showing the I-V relationship for Cu-based cells with methane.

The effect of adding ceria and Pd, using dry methane as a fuel is shown in FIGS. 7 and 8. Before discussing the I-V curves, it is important to address the stability issues. As expected, the Ni-YSZ anode prepared in accordance with the method of this invention deactivated rapidly. While we did observe currents at 800° C., they decreased rapidly over the period of a few minutes with the formation of a carbonaceous residue. This is shown in FIG. 7, which shows the current density for a Ni/$CeO_2$/YSZ (open circles) at a cell voltage of 0.5 volts with switching of fuels from dry $H_2$ to dry $CH_4$ and back. The cell with a Ni/$CeO_2$/YSZ anode deactivated rapidly. Visual inspection showed the presence of carbon. By contrast, the Cu/$CeO_2$/YSZ cells were entirely stable. Following exposure to dry $CH_4$ for up to three days, we observed no evidence of decreased performance or carbon formation.

The performance of the Cu-based cells with methane is shown in FIG. 8. For the Cu-YSZ anode, the OCV was only about 0.5 volts and the power density was minimal. Addition of ceria led to a dramatic improvement, as did the addition of Pd. However, the maximum power density with methane is still much lower than with hydrogen, about 80 mW/cm² compared to 165 mW/cm². This difference between methane and hydrogen is lowered by working at higher temperatures. At 900° C., the maximum power density achieved with this cell was about 230 mW/cm² with $H_2$ and 160 mW/cm² with $CH_4$. This suggests that the catalytic reaction is at least partly limiting the reaction with methane, but that reasonable performance can be achieved with dry methane if a catalytic component is added.

As demonstrated hereinabove, we have developed an entirely new method for fabricating anodes which allows the addition of metals and/or catalytic materials after the high-temperature calcination step. We have demonstrated that we can achieve similar performance levels with Cu-cermets as can be achieved with Ni-cermets. And, we have found that ceria plays an important role in anode design.

While in the forgoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for preparation of an anode for a solid oxide fuel cell comprising the steps of:

mixing a porous matrix material with a yttria-stabilized-zirconia (YSZ) powder, forming a porous matrix material/powder mixture;

forming said porous matrix material/powder mixture into a porous YSZ layer;

calcining said porous YSZ layer; and impregnating said porous YSZ layer with a metal-containing salt solution comprising an electron-conducting metal having an oxide form which melts at a temperature less than about 1550° C.

2. A method in accordance with claim 1, wherein said porous matrix material comprises a plurality of zircon fibers.

3. A method in accordance with claim 1, wherein said porous matrix material/powder mixture is mixed with glycerol and applied to an anode side of a YSZ electrolyte, forming said porous YSZ layer on said anode side of YSZ electrolyte.

4. A method in accordance with claim 1, wherein said porous matrix material/powder mixture is added to a tapecast and said tapecast is deposited onto an anode side of a YSZ electrolyte layer, forming said porous YSZ layer on said anode side of YSZ electrolyte.

5. A method in accordance with claim 4, wherein a cathode is applied to a cathode side of said YSZ electrolyte layer after said calcining of said porous YSZ layer.

6. A method in accordance with claim 1, wherein a metal content of said porous YSZ layer is at least about 35% by weight of said porous YSZ layer.

7. A method in accordance with claim 1, wherein said impregnated porous YSZ layer is calcined.

8. A method in accordance with claim 1, wherein said porous YSZ layer is impregnated with ceria.

9. A method in accordance with claim 8, wherein said ceria constitutes in a range of about 5% to about 40% by weight of said porous YSZ layer.

10. A method for producing a solid oxide fuel cell comprising the steps of:

mixing a porous matrix material with a yttria-stabilized-zirconia (YSZ) powder, forming a porous matrix material/powder mixture;

mixing said porous matrix material/powder mixture with glycerol, forming a slurry;

applying said slurry to an anode-facing face of a dense YSZ electrolyte layer, forming a porous anode layer/electrolyte layer assembly;

calcining said porous anode layer/electrolyte layer assembly;

applying a cathode layer to a cathode-facing face of said electrolyte layer, forming a fuel cell assembly;

impregnating said porous anode layer with a metal-containing salt solution comprising an electron-conducting metal having an oxide form which melts at a temperature less than about 1550° C.; and calcining said impregnated porous anode layer.

11. A method in accordance with claim 10, wherein a metal content of said calcined impregnated porous anode layer is at least about 35% by weight of said calcined impregnated porous anode layer.

12. A method in accordance with claim 10, wherein said porous matrix material comprises a plurality of zircon fibers.

13. In a solid oxide fuel cell comprising an anode electrode, a cathode electrode and an electrolyte disposed between said anode electrode and said cathode electrode, the improvement comprising:

said anode electrode comprising a porous YSZ layer and one of a Cu metal and a Cu alloy.

14. A solid oxide fuel cell in accordance with claim 13, wherein said anode electrode further comprises ceria.

15. A solid oxide fuel cell in accordance with claim 13, wherein a metal content of said anode electrode is at least about 35% by weight of said porous YSZ layer.

16. A solid oxide fuel cell in accordance with claim 14, wherein a ceria content of said anode electrode is in a range of about 5% to 40% by weight of said porous YSZ layer.

17. A method for generating electricity comprising the steps of:

introducing at least one of a hydrocarbon and a carbonaceous fuel directly into an anode side of a solid oxide fuel cell comprising an anode electrode comprising a porous YSZ layer and an electron-conducting metal having an oxide form which melts at a temperature less than about 1550° C., a cathode electrode and an electrolyte disposed between said anode electrode and said cathode electrode;

introducing an oxidant into a cathode side of said solid oxide fuel cell; and directly oxidizing said at least one of said hydrocarbon and said carbonaceous fuel in said solid oxide fuel cell, resulting in generation of electricity.

18. A method in accordance with claim 17, wherein said hydrocarbon comprises at least two carbon atoms.

19. A method in accordance with claim 17, wherein said anode electrode further comprises ceria.

20. A method in accordance with claim 17, wherein said carbonaceous fuel is an alcohol.

* * * * *